(12) United States Patent
Nishimoto et al.

(10) Patent No.: US 9,409,624 B2
(45) Date of Patent: Aug. 9, 2016

(54) BICYCLE SPROCKET

(71) Applicant: SHIMANO INC., Sakai (JP)

(72) Inventors: Yusuke Nishimoto, Sakai (JP); Atsuhiro Emura, Sakai (JP)

(73) Assignee: SHIMANO INC., Sakai (JP)

( * ) Notice: Subject to any disclaimer, the term of this patent is extended or adjusted under 35 U.S.C. 154(b) by 284 days.

(21) Appl. No.: 14/250,721

(22) Filed: Apr. 11, 2014

(65) Prior Publication Data

US 2015/0291255 A1    Oct. 15, 2015

(51) Int. Cl.
*B62M 9/10* (2006.01)
*B62M 9/06* (2006.01)

(52) U.S. Cl.
CPC ........ *B62M 9/105* (2013.01); *B62M 9/06* (2013.01)

(58) Field of Classification Search
CPC ........... B62M 9/06; B62M 9/105; B62M 9/10
See application file for complete search history.

(56) References Cited

U.S. PATENT DOCUMENTS

| 591,270 | A | 10/1897 | Gauthier | |
|---|---|---|---|---|
| 593,714 | A | 11/1897 | Baldwin | |
| 619,537 | A | 2/1899 | Bufford | |
| 3,709,053 | A * | 1/1973 | Ohshita | B62M 9/105 474/156 |
| 5,226,857 | A * | 7/1993 | Ono | F16G 13/06 474/231 |
| 2013/0139642 | A1 | 6/2013 | Reiter et al. | |
| 2015/0191214 | A1 * | 7/2015 | Emura | B62M 3/00 74/594.2 |

FOREIGN PATENT DOCUMENTS

DE    102007049880    4/2009

* cited by examiner

*Primary Examiner* — William E Dondero
*Assistant Examiner* — Robert T Reese
(74) *Attorney, Agent, or Firm* — Mori & Ward, LLP

(57) ABSTRACT

A bicycle sprocket comprises sprocket teeth. The sprocket teeth include a first tooth and a second tooth. The first tooth has a chain-engaging axial width which is larger than a first distance defined between opposed inner link plates of a bicycle chain and which is smaller than a second distance defined between opposed outer link plates of the bicycle chain. The second tooth has a chain-engaging axial width which is larger than the first distance and which is smaller than the second distance. The first tooth and the second tooth are spaced apart from each other in a circumferential direction of the bicycle sprocket to define a space which is free of a tooth configured to engage with the bicycle chain.

20 Claims, 16 Drawing Sheets

BICYCLE SPROCKET

BACKGROUND OF THE INVENTION

1. Field of the Invention

The present invention relates to a bicycle sprocket.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a bicycle sprocket.

Most bicycles have a drive train that uses the bicycle sprocket to transmit the pedaling action from the rider to a bicycle wheel through a bicycle chain. A front sprocket and a rear sprocket have been known as the bicycle sprocket. The bicycle sprocket generally includes a plurality of teeth to engage with the bicycle chain.

SUMMARY OF THE INVENTION

In accordance with a first aspect of the present invention, a bicycle sprocket comprises sprocket teeth. The sprocket teeth include a first tooth and a second tooth. The first tooth has a chain-engaging axial width which is larger than a first distance defined between opposed inner link plates of a bicycle chain and which is smaller than a second distance defined between opposed outer link plates of the bicycle chain. The second tooth has a chain-engaging axial width which is larger than the first distance and which is smaller than the second distance. The first tooth and the second tooth are spaced apart from each other in a circumferential direction of the bicycle sprocket to define a space which is free of a tooth configured to engage with the bicycle chain.

In accordance with a second aspect of the present invention, the bicycle sprocket according to the first aspect is configured so that each of the sprocket teeth has a chain-engaging axial width which is larger than the first distance and which is smaller than the second distance.

In accordance with a third aspect of the present invention, the bicycle sprocket according to the second aspect is configured so that all the sprocket teeth are spaced apart from each other in the circumferential direction to define spaces which is free of a tooth configured to engage with the bicycle chain.

In accordance with a fourth aspect of the present invention, the bicycle sprocket according to the second aspect is configured so that a tooth pitch defined between adjacent two of the sprocket teeth is twice as long as a roller pitch defined between adjacent two of rollers of the bicycle chain.

In accordance with a fifth aspect of the present invention, the bicycle sprocket according to the first aspect is configured so that at least one of the first tooth and the second tooth includes a chamfered part configured to reduce interfere between one of the inner link plates of the bicycle chain and the at least one of the first tooth and the second tooth in a state where the first tooth and the second tooth engage with the bicycle chain.

In accordance with a sixth aspect of the present invention, the bicycle sprocket according to the fifth aspect is configured so that each of the first tooth and second tooth includes a tooth bottom defining a root circle of the bicycle sprocket. The chamfered part of the at least one of the first tooth and the second tooth is adjacent to the tooth bottom of the at least one of the first tooth and the second tooth.

In accordance with a seventh aspect of the present invention, the bicycle sprocket according to the first aspect further comprises at least one additional tooth having a chain-engaging axial width which is smaller than the first distance. Each of the at least one additional tooth is disposed between adjacent two of the sprocket teeth such that the bicycle chain is shifted between the bicycle sprocket and additional bicycle sprocket in an area in which the at least one additional tooth is positioned.

In accordance with an eighth aspect of the present invention, the bicycle sprocket according to the first aspect further comprises a spike pin configured to guide the bicycle chain toward the sprocket teeth during shifting operation.

In accordance with a ninth aspect of the present invention, the bicycle sprocket according to the first aspect is configured so that each of the sprocket teeth has a multi-layered structure with different materials.

In accordance with a tenth aspect of the present invention, the bicycle sprocket according to the ninth aspect is configured so that each of the sprocket teeth includes a first sprocket layer, a second sprocket layer, and a third sprocket layer. The first sprocket layer is made of a first-layer material comprising iron. The second sprocket layer is made of a second-layer material comprising aluminum. The third sprocket layer is made of a third-layer material comprising iron. The second sprocket layer is provided between the first sprocket layer and the third sprocket layer.

In accordance with an eleventh aspect of the present invention, the bicycle sprocket according to the ninth aspect is configured so that each of the sprocket teeth includes a first sprocket layer, a second sprocket layer, and a third sprocket layer. The first sprocket layer is made of a first-layer material comprising iron. The second sprocket layer is made of a second-layer material comprising a resin material. The third sprocket layer is made of a third-layer material comprising iron. The second sprocket layer is provided between the first sprocket layer and the third sprocket layer.

In accordance with a twelfth aspect of the present invention, the bicycle sprocket according to the first aspect is configured so that each of the sprocket teeth includes a tooth bottom defining a root circle of the bicycle sprocket. At least one of the sprocket teeth includes a closed opening at least partially provided radially outward of the root circle.

In accordance with a thirteenth aspect of the present invention, the bicycle sprocket according to the first aspect is configured so that at least one of the sprocket teeth includes a cutout configured increase flexibility of the at least one of the sprocket teeth.

In accordance with a fourteenth aspect of the present invention, the bicycle sprocket according to the first aspect further comprises a recess provided between the first tooth and the second tooth in a circumferential direction of the bicycle sprocket.

In accordance with a fifteenth aspect of the present invention, the bicycle sprocket according to the fourteenth aspect is configured so that the first tooth includes a first tooth bottom defining a root circle of the bicycle sprocket. The second tooth includes a second tooth bottom defining the root circle. The recess is provided between the first tooth bottom and the second tooth bottom in a circumferential direction of the bicycle sprocket.

In accordance with a sixteenth aspect of the present invention, the bicycle sprocket according to the first aspect further comprises a sprocket body having an annular shape. The sprocket teeth are separate members from each other and spaced apart from each other in a circumferential direction of the bicycle sprocket. Each of the sprocket teeth includes a base part and a tooth part. The base part is implanted in the sprocket body. The tooth part radially outwardly protrudes from the base part.

In accordance with a seventeenth aspect of the present invention, the bicycle sprocket according to the sixteenth aspect is configured so that each of the sprocket teeth is made of a first material comprising a metallic material. The sprocket body is made of a second material comprising a resin material.

In accordance with an eighteenth aspect of the present invention, the bicycle sprocket according to the first aspect is configured so that the sprocket teeth are equally spaced apart from each other in a circumferential direction of the bicycle sprocket. Each of the sprocket teeth has a center line radially extending from a rotational axis of the bicycle sprocket. Each of the sprocket teeth has a symmetrical shape with respect to the center line.

In accordance with a nineteenth aspect of the present invention, the bicycle sprocket according to the first aspect is configured so that at least one of the first tooth and the second tooth includes a radial contact part configured to contact at least one of intermediate portions of outer link plates of the bicycle chain in a radial direction of the bicycle sprocket in a state where the at least one of the first tooth and the second tooth engages with the outer link plates of the bicycle chain.

In accordance with a twentieth aspect of the present invention, the bicycle sprocket according to the nineteenth aspect is configured so that the radial contact part has an axial width larger than the second distance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
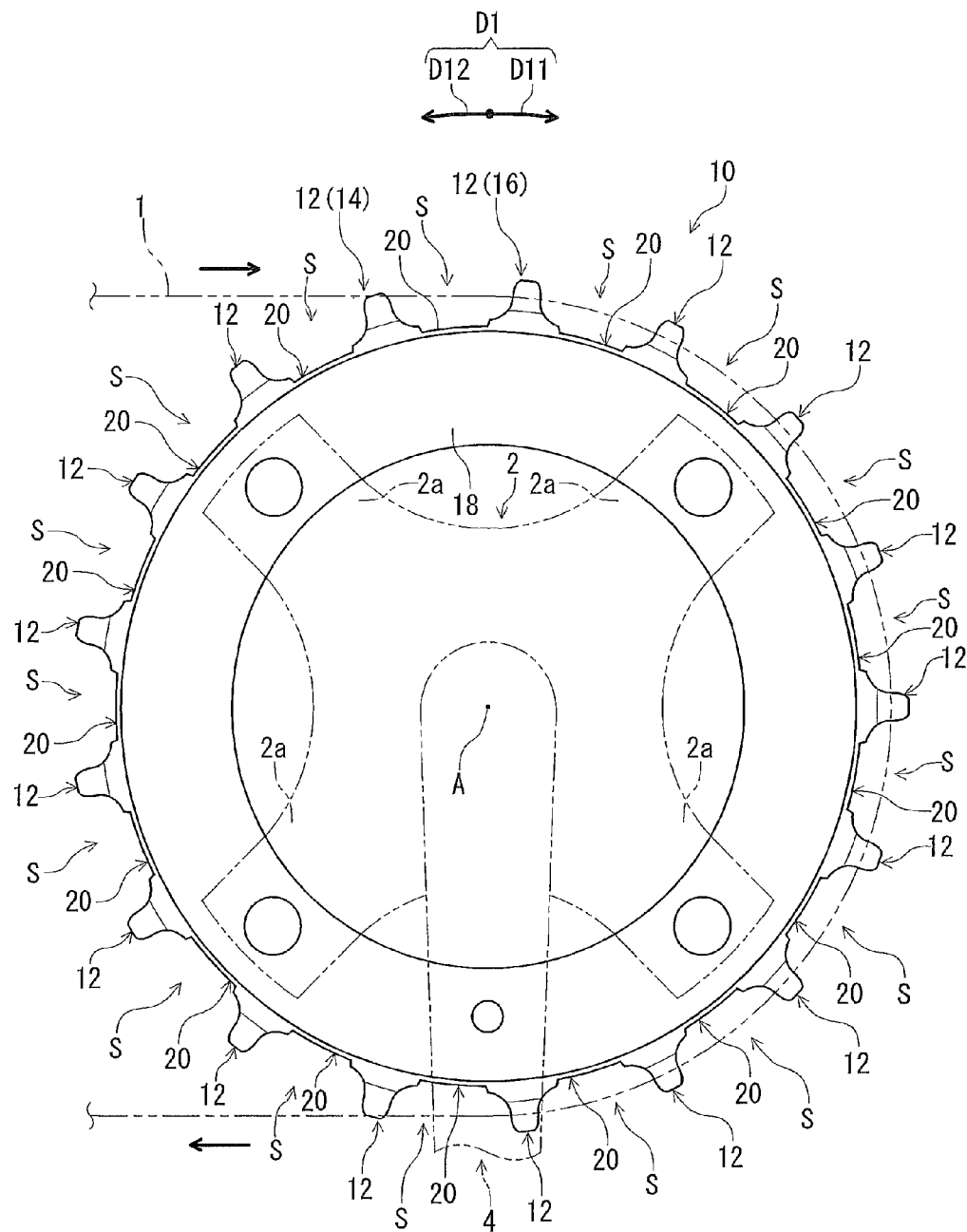
FIG. 1 is an elevational view of a bicycle sprocket in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle sprocket 10 in accordance with a first embodiment is configured to engage with a bicycle chain 1. The bicycle sprocket 10 is rotatable about a rotational center axis A. In the illustrated embodiment, the bicycle sprocket 10 is a front sprocket configured to be provided on a gear crank (right crank) of a bicycle. Structures of the bicycle sprocket 10 can, however, be applied to a rear sprocket.

The bicycle sprocket 10 is configured to be fastened to crank connecting arms 2a of a sprocket mounting member 2 by bolts (not shown). The sprocket mounting member 2 is fastened on a crank arm 4 to be rotatable integrally with the crank arm 4 about the rotational center axis A. The sprocket mounting member 2 can also be integrally provided with the crank arm 4 as a single unitary member. Namely, the bicycle sprocket 10 is configured to be rotatable integrally with the sprocket mounting member 2 and the crank arm 4 about the rotational center axis A. The bicycle sprocket 10 is configured to be rotated about the rotational center axis A in a rotational driving direction D11 during the pedaling. The rotational driving direction D11 is defined along a circumferential direction D1 of the bicycle sprocket 10. A direction D12 is defined along the circumferential direction D1. The direction D12 is opposite to the rotational driving direction D11.

As seen in FIG. 1, the bicycle sprocket 10 comprises sprocket teeth 12. The sprocket teeth 12 are arranged in the circumferential direction D1. The bicycle sprocket 10 further comprises a sprocket body 18 having an annular shape. The sprocket teeth 12 radially outwardly protrude from the sprocket body 18. The sprocket body 18 is configured to be fastened to the crank connecting arms 2a of the sprocket mounting member 2 by bolts (not shown). In the illustrated embodiment, the sprocket teeth 12 and the sprocket body 18 comprise a metallic material such as iron and titanium. The sprocket teeth 12 are integrally provided with the sprocket body 18 as a single unitary member. The sprocket teeth 12 can, however, be separately provided from the sprocket body 18.

As seen in FIG. 1, the sprocket teeth 12 include a first tooth 14 and a second tooth 16. The first tooth 14 and the second tooth 16 are spaced apart from each other in the circumferential direction D1 of the bicycle sprocket 10 to define a space S which is free of a tooth configured to engage with the bicycle chain 1. In the illustrated embodiment, all the sprocket teeth 12 are spaced apart from each other in the circumferential direction D1 to define spaces S which is free of a tooth configured to engage with the bicycle chain 1. Namely, each of the sprocket teeth 12 can be one of the first tooth 14 and the second tooth 16.

The bicycle sprocket 10 further comprises a recess 20 provided between the first tooth 14 and the second tooth 16 in the circumferential direction D1 of the bicycle sprocket 10. In the illustrated embodiment, the bicycle sprocket 10 comprises recesses 20 provided between the sprocket teeth 12 in the circumferential direction D1.

Figure 2:
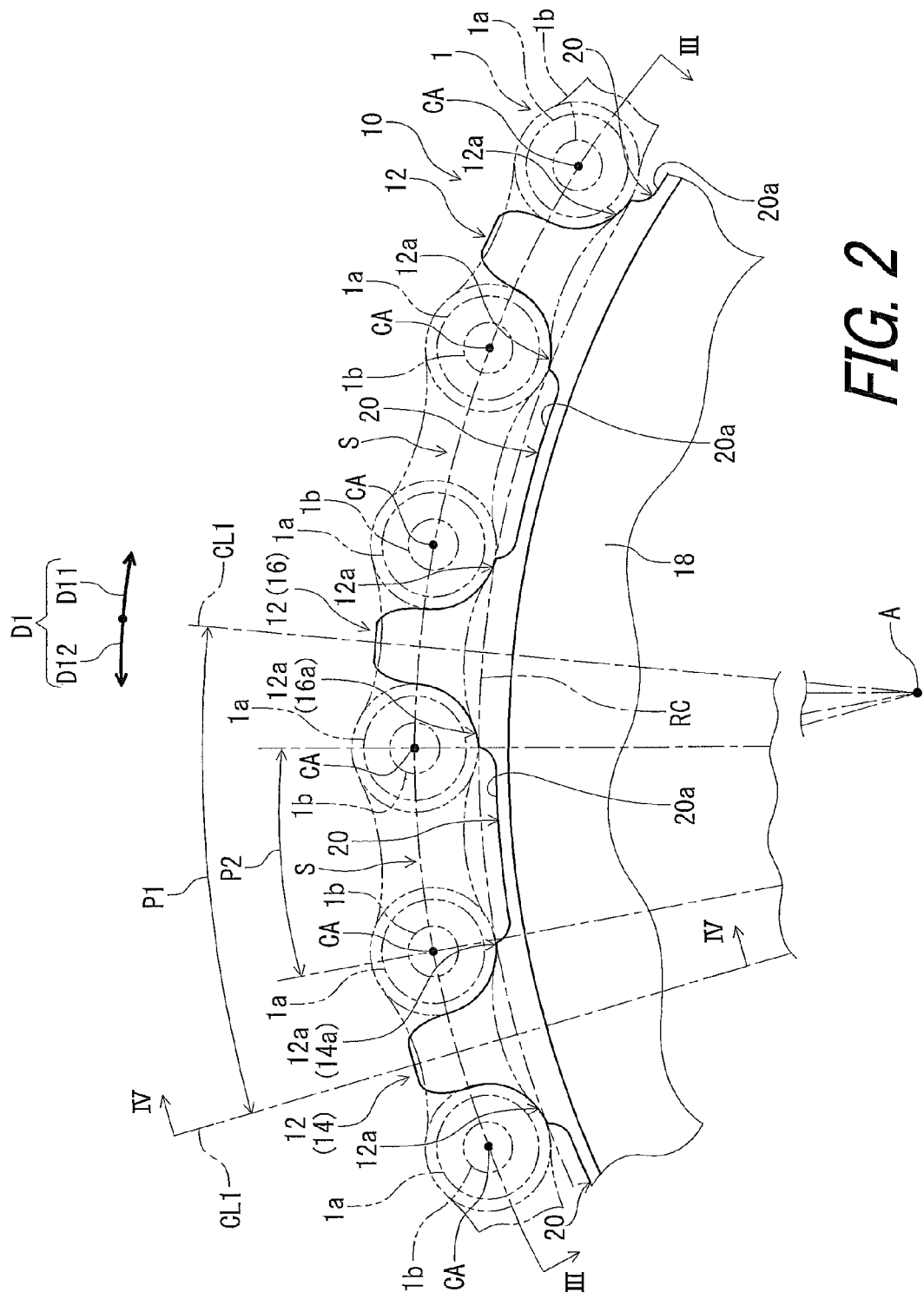
FIG. 2 is an enlarged elevational view of the bicycle sprocket illustrated in FIG. 1.

As seen in FIG. 2, the first tooth 14 includes a first tooth bottom 14a defining a root circle RC of the bicycle sprocket 10. The second tooth 16 includes a second tooth bottom 16a defining the root circle RC. The recess 20 is provided between the first tooth bottom 14a and the second tooth bottom 16a in the circumferential direction D1 of the bicycle sprocket 10. More specifically, each of the sprocket teeth 12 includes tooth bottoms 12a defining the root circle RC. Each of the recesses 20 includes a bottom surface 20a provided radially inward of the root circle RC.

A tooth pitch P1 defined between adjacent two of the sprocket teeth 12 is twice as long as a roller pitch P2 defined between adjacent two of rollers 1a of the bicycle chain 1. Each of the tooth pitch P1 and the roller pitch P2 is defined as an angular range about the rotational center axis A. The tooth pitch P1 is defined between circumferential center lines CL1 of adjacent two of the sprocket teeth 12. The roller pitch P2 is defined between center axes CA of adjacent two of pins 1b which rotatably support the rollers 1a.

Figure 3:
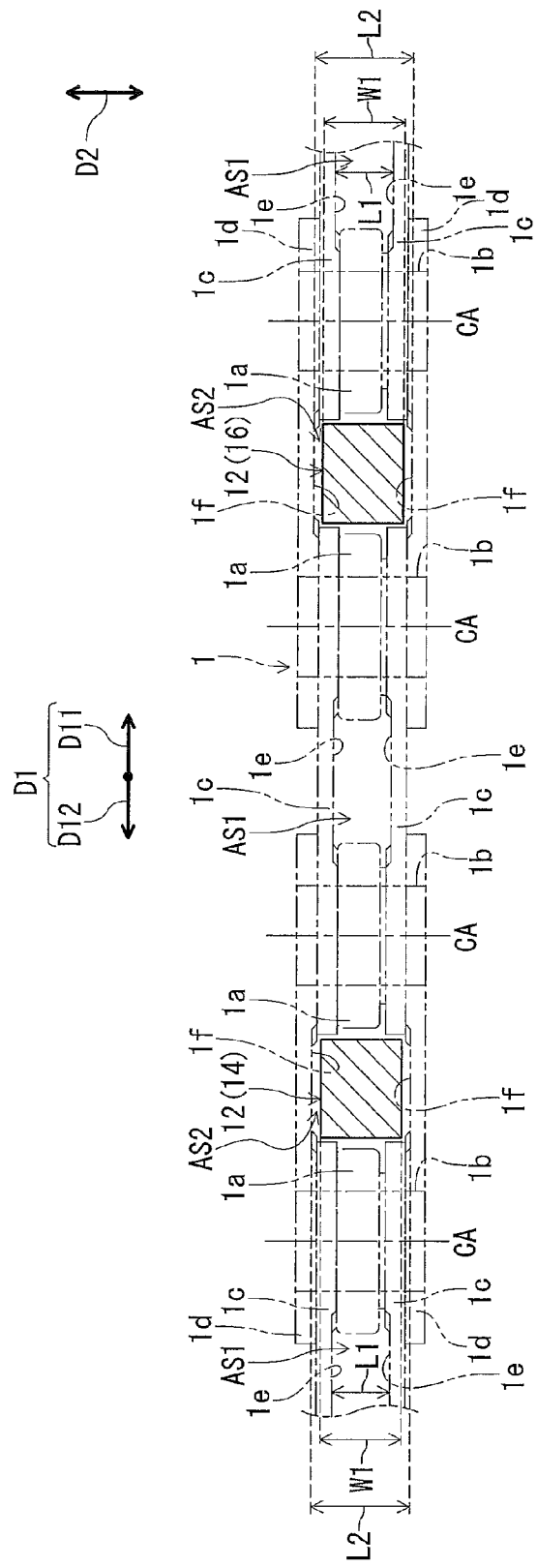
FIG. 3 is a cross-sectional view of the bicycle sprocket taken along line of FIG. 2.

As seen in FIG. 3, the first tooth 14 has a chain-engaging axial width W1 which is larger than a first distance L1 defined between opposed inner link plates 1c of the bicycle chain 1 and which is smaller than a second distance L2 defined between opposed outer link plates 1d of the bicycle chain 1. The second tooth 16 has a chain-engaging axial width W1 which is larger than the first distance L1 and which is smaller than the second distance L2. In the illustrated embodiment, each of the sprocket teeth 12 has the chain-engaging axial width W1 which is larger than the first distance L1 and which is smaller than the second distance L2.

As seen in FIG. 3, the opposed inner link plates 1c include opposed inner surfaces 1e defining an axial space AS1. The opposed outer link plates 1d includes opposed inner surfaces if defining an axial space AS2. The first distance L1 is an axial distance between the opposed inner surfaces 1e of the opposed inner link plates 1c in a direction D2 parallel to the center axes CA of the pins 1b. The second distance L2 is an axial distance between the opposed inner surfaces 1f of the opposed outer link plates 1d in the direction D2 parallel to the center axes CA of the pins 1b.

Figure 4:
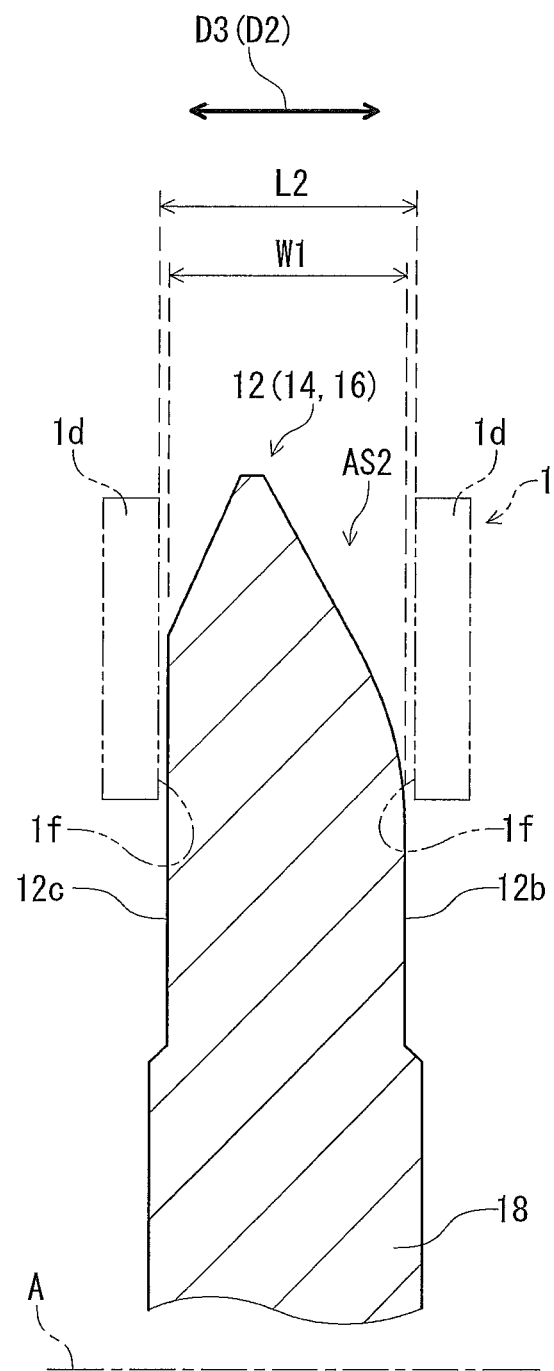
FIG. 4 is a cross-sectional view of the bicycle sprocket taken along line IV-IV of FIG. 2.

As seen in FIG. 4, each of the sprocket teeth 12 has a first chain-engaging surface 12b and a second chain-engaging surface 12c. The first chain-engaging surface 12b and the second chain-engaging surface 12c face in the axial direction D3. The first chain-engaging surface 12b and the second chain-engaging surface 12c are contactable with the opposed inner surfaces 1f of the outer link plates 1d, respectively. For example, the chain-engaging axial width W1 is a maximum axial width defined between the first chain-engaging surface 12b and the second chain-engaging surface 12c in an axial direction D3 parallel to the rotational axis A of the bicycle sprocket 10. In a state where the bicycle chain 1 engages with the sprocket teeth 12, the axial direction D3 coincides with the direction D2 defined with respect to the bicycle chain 1.

As seen in FIG. 3, with the bicycle sprocket 10, the first tooth 14 and the second tooth 16 have the chain-engaging axial width W1 which is larger than the first distance L1 defined between the opposed inner link plates 1c and which is smaller than the second distance L2 defined between the opposed outer link plates 1d. This improves holding function of the bicycle sprocket 10 for the bicycle chain 1.

Furthermore, as seen in FIGS. 1 and 2, the first tooth 14 and the second tooth 16 are spaced apart from each other in the circumferential direction D1 of the bicycle sprocket 10 to define the space S which is free of a tooth configured to engage with the bicycle chain 1. This allows weight of the bicycle sprocket 10 to be saved. Further, the bicycle chain 1 is less likely to fail to engage the sprocket teeth 12 due to less number of the sprocket teeth 12 in comparison with a conventional sprocket.

Second Embodiment

A bicycle sprocket 210 in accordance with a second embodiment will be described below referring to FIGS. 5 and 6. The bicycle sprocket 210 has the same configuration as the bicycle sprocket 10 except for the sprocket teeth 12. Thus, elements having substantially the same function as those in the first embodiment will be numbered the same here, and will not be described again in detail here for the sake of brevity.

Figure 5:
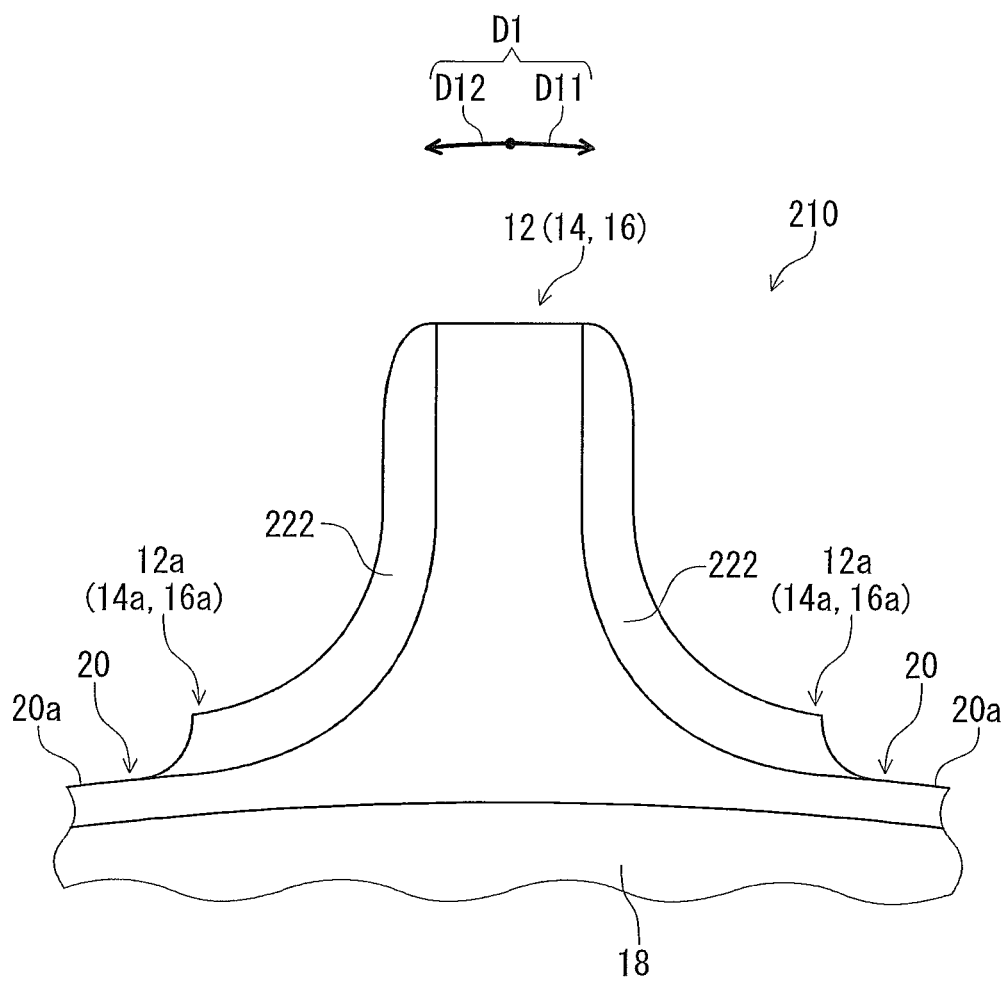
FIG. 5 is an enlarged elevational view of a bicycle sprocket in accordance with a second embodiment.
Figure 6:
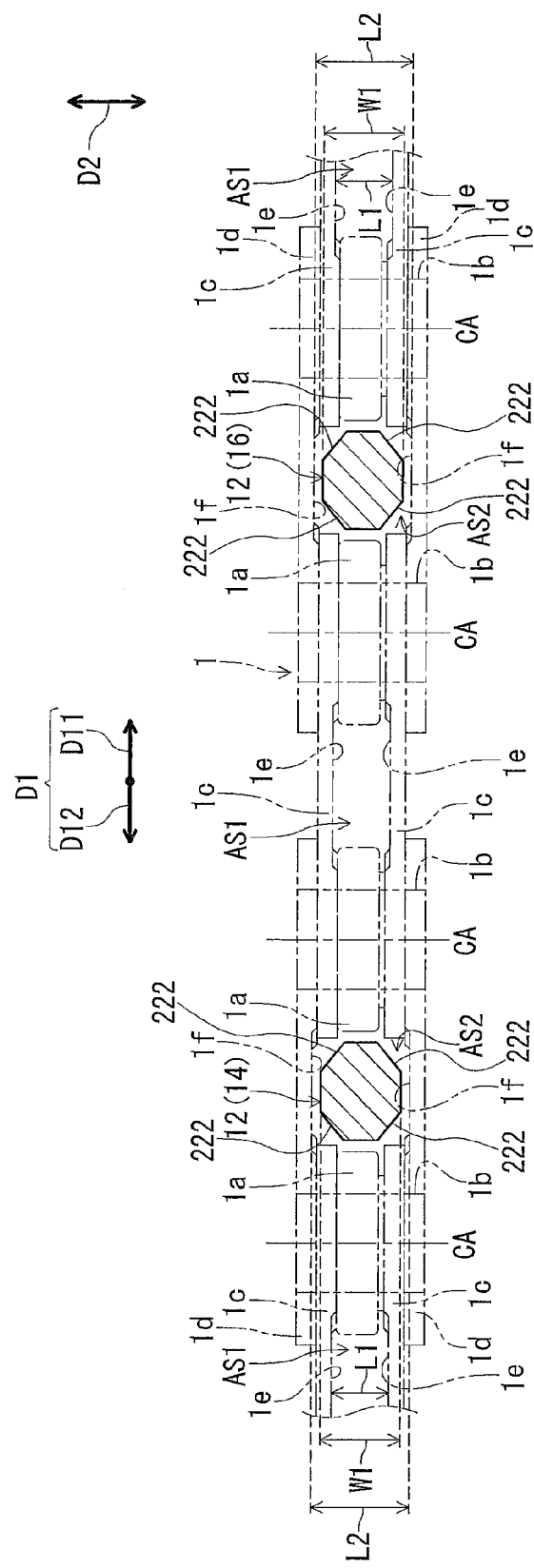
FIG. 6 is a cross-sectional view of the bicycle sprocket illustrated in FIG. 5.

As seen in FIGS. 5 and 6, in the bicycle sprocket 210, at least one of the first tooth 14 and the second tooth 16 includes a chamfered part configured to reduce interfere between one of the inner link plates 1c of the bicycle chain 1 and the at least one of the first tooth 14 and the second tooth 16 in a state where the first tooth 14 and the second tooth 16 engage with the bicycle chain 1.

In the illustrated embodiment, the first tooth 14 includes chamfered parts 222 configured to reduce interfere between one of the inner link plates 1c of the bicycle chain 1 and the first tooth 14 in a state where the first tooth 14 engages with the bicycle chain 1. The second tooth 16 includes chamfered parts 222 configured to reduce interfere between the second tooth 16 and one of the inner link plates 1c of the bicycle chain 1 in a state where the second tooth 16 engages with the bicycle chain 1.

More specifically, as seen in FIGS. 5 and 6, each of the sprocket teeth 12 includes chamfered parts 222 configured to reduce interfere between each of the sprocket teeth 12 and one of the inner link plates 1c of the bicycle chain 1 in a state where the sprocket teeth 12 engage with the bicycle chain 1.

As seen in FIG. 6, the chamfered part 222 of the at least one of the first tooth 14 and the second tooth 16 is adjacent to the tooth bottom of the at least one of the first tooth 14 and the second tooth 16. In the illustrated embodiment, the chamfered part 222 of the first tooth 14 is adjacent to the first tooth bottom 14a of the first tooth 14. The chamfered part 222 of the second tooth 16 is adjacent to the second tooth bottom 16a of the second tooth 16. The chamfered part 222 of the first tooth 14 preferably extends from the first tooth bottom 14a to an end of the first tooth 14. The chamfered part 222 of the second tooth 16 preferably extends from the second tooth bottom 16a to an end of the second tooth 16.

With the bicycle sprocket 210, the chamfered part 222 can reduce wear of the first tooth 14 and/or the second tooth 16 in addition to the advantageous effect obtained by the bicycle sprocket 10 in accordance with the first embodiment.

Third Embodiment

A bicycle sprocket 310 in accordance with a third embodiment will be described below referring to FIGS. 7 and 8. The bicycle sprocket 310 has the same configuration as the bicycle sprocket 10 except for sprocket teeth. Thus, elements having substantially the same function as those in the first embodiment will be numbered the same here, and will not be described again in detail here for the sake of brevity.

Figure 7:
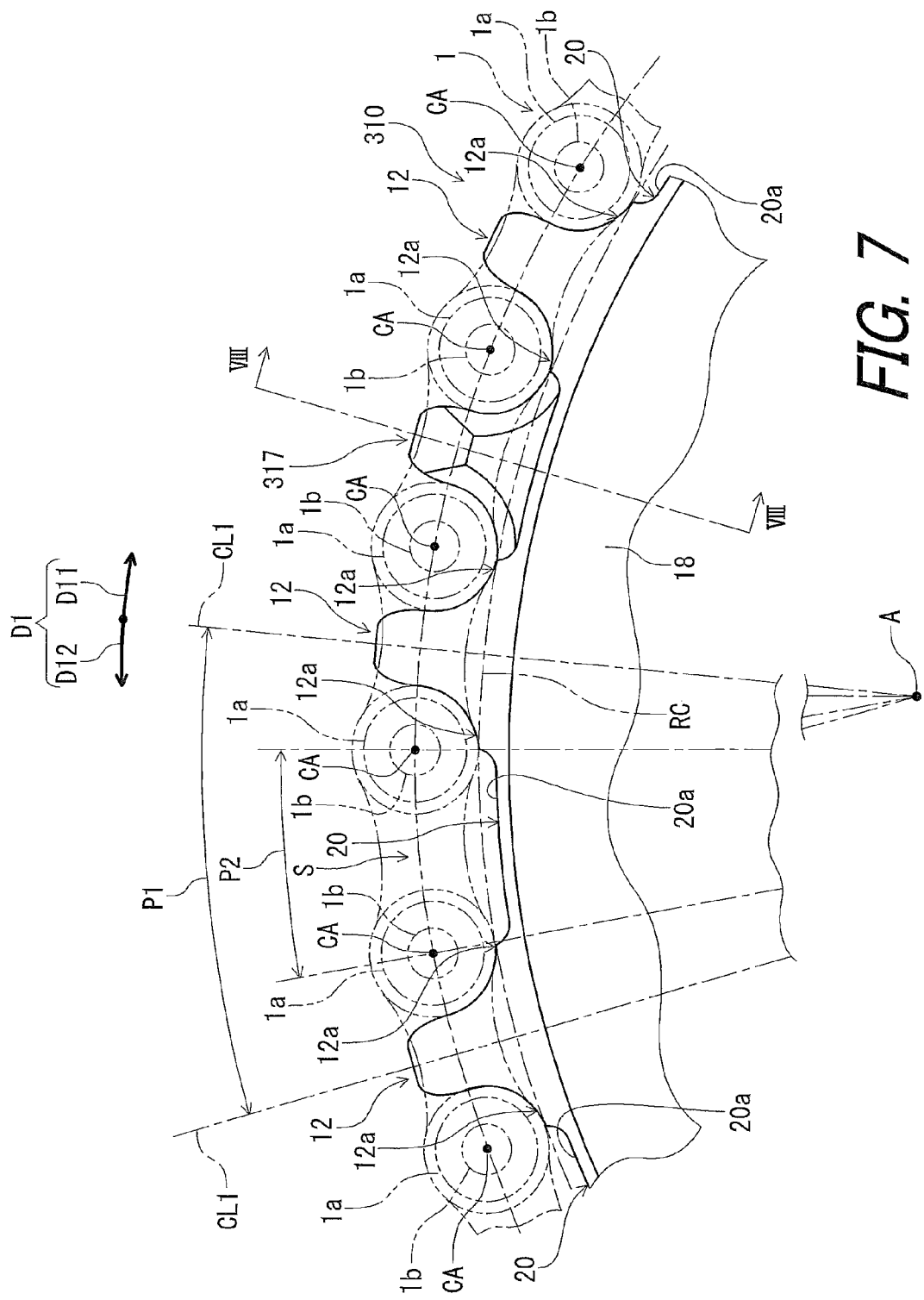
FIG. 7 is an enlarged elevational view of a bicycle sprocket in accordance with a third embodiment.
Figure 8:
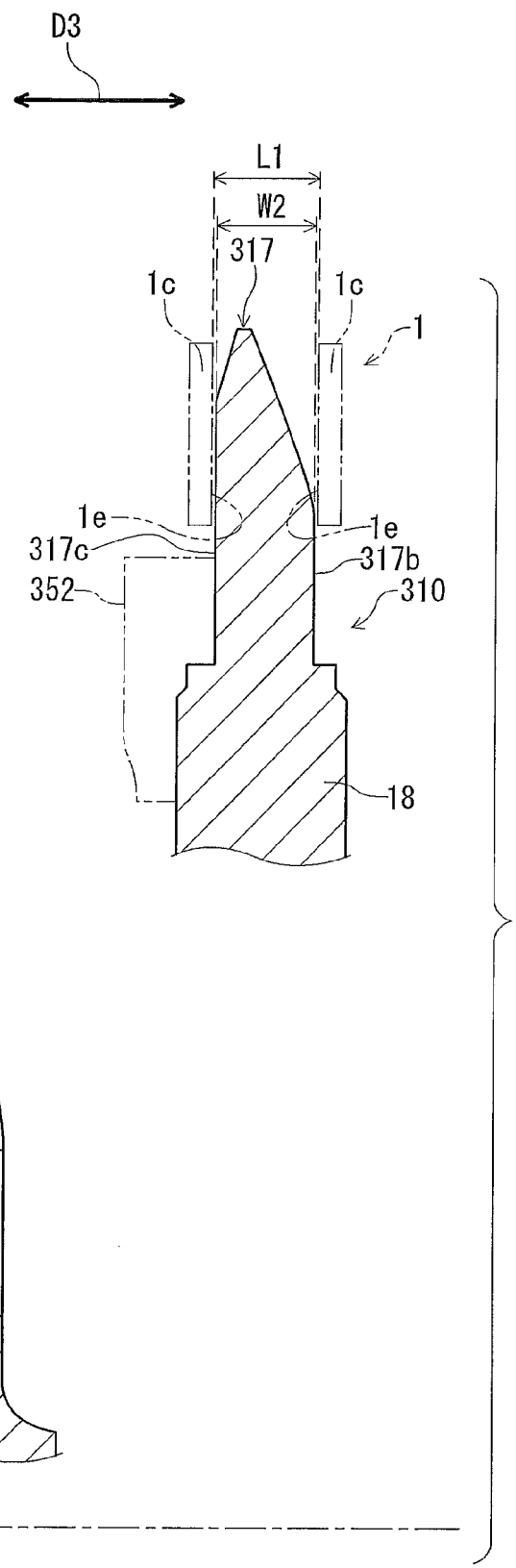
FIG. 8 is a cross-sectional view of the bicycle sprocket taken along line VIII-VIII of FIG. 7.

As seen in FIGS. 7 and 8, the bicycle sprocket 310 further comprises at least one additional tooth having a chain-engaging axial width which is smaller than the first distance L1. Each of the at least one additional tooth is disposed between adjacent two of the sprocket teeth 12 such that the bicycle chain 1 is shifted between the bicycle sprocket 10 and another bicycle sprocket in an area in which the at least one additional tooth is positioned.

In the illustrated embodiment, the bicycle sprocket 310 further comprises an additional tooth 317. The additional tooth 317 is disposed between adjacent two of the sprocket teeth 12 such that the bicycle chain 1 is shifted between the bicycle sprocket 10 and additional bicycle sprocket 350 in areas in which the additional tooth 317 is positioned. The additional bicycle sprocket 350 is rotatable integrally with the bicycle sprocket 310. The structures of the bicycle sprocket 310 can be applied to the additional bicycle sprocket 350.

As seen in FIG. 8, the additional tooth 317 has a chain-engaging axial width W2 which is smaller than the first distance L1. The additional tooth 317 has a first chain-engaging surface 317b and a second chain-engaging surface 317c. The first chain-engaging surface 317b and the second chain-engaging surface 317c face in the axial direction D3. The first chain-engaging surface 317b and the second chain-engaging surface 317c are contactable with the opposed inner surfaces 1e of the inner link plates 1c, respectively. For example, the chain-engaging axial width W2 is a maximum axial width defined between the first chain-engaging surface 317b and the second chain-engaging surface 317c in the axial direction D3 parallel to the rotational axis A of the bicycle sprocket 310.

As seen in FIG. 8, the bicycle sprocket 310 further comprises a spike pin 352 configured to guide the bicycle chain 1 toward the sprocket teeth 12 (FIG. 7) during shifting operation. The spike pin 352 is made of a metallic material and is a separate member from the sprocket teeth 12 and the sprocket body 18. At least one of the spike pins 352 can, however, be integrally provided with at least one of the sprocket teeth 12 and the sprocket body 18.

As described above, the bicycle sprocket 10 in accordance with the first embodiment can be applied to a bicycle sprocket assembly for shifting gears.

Fourth Embodiment

A bicycle sprocket 410 in accordance with a fourth embodiment will be described below referring to FIG. 9. The bicycle sprocket 410 has the same configuration as the bicycle sprocket 10 except for the sprocket teeth 12. Thus, elements having substantially the same function as those in the first embodiment will be numbered the same here, and will not be described again in detail here for the sake of brevity.

Figure 9:
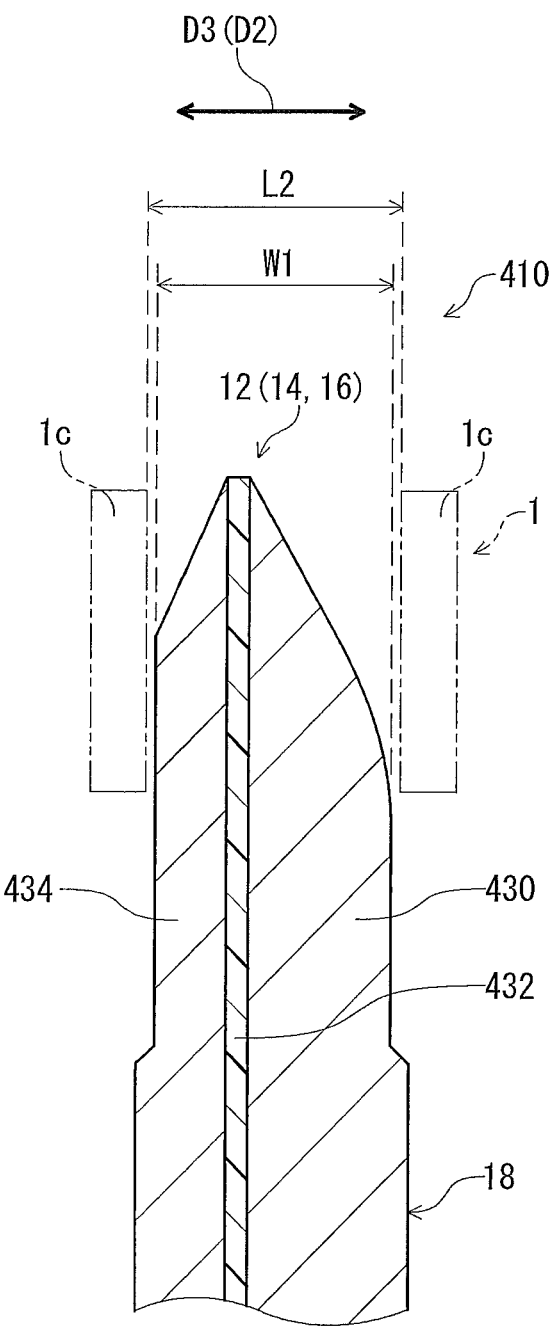
FIG. 9 is a cross-sectional view of a bicycle sprocket in accordance with a fourth embodiment.

As seen in FIG. 9, each of the sprocket teeth 12 has a multi-layered structure with different materials. Each of the sprocket teeth 12 includes a first sprocket layer 430, a second sprocket layer 432, and a third sprocket layer 434. For example, the first sprocket layer 430 is made of a first-layer material comprising iron. The second sprocket layer 432 is made of a second-layer material comprising aluminum. The third sprocket layer 434 is made of a third-layer material comprising iron. The second sprocket layer 432 is provided between the first sprocket layer 430 and the third sprocket layer 434. For example, the first sprocket layer 430 and the third sprocket layer 434 are bonded to the second sprocket layer 432 by integral molding.

Materials of the multi-layered structure of the sprocket teeth 12 are not limited to the above embodiment. For example, the second sprocket layer 432 can be made of a second-layer material comprising a resin material.

With the bicycle sprocket 410, the multi-layered structure can save weight of the sprocket teeth 12 in addition to the advantageous effect obtained by the bicycle sprocket 10 in accordance with the first embodiment.

Fifth Embodiment

A bicycle sprocket 510 in accordance with a fifth embodiment will be described below referring to FIG. 10. The bicycle sprocket 510 has the same configuration as the bicycle sprocket 10 except for the sprocket teeth 12. Thus, elements having substantially the same function as those in the first embodiment will be numbered the same here, and will not be described again in detail here for the sake of brevity.

Figure 10:
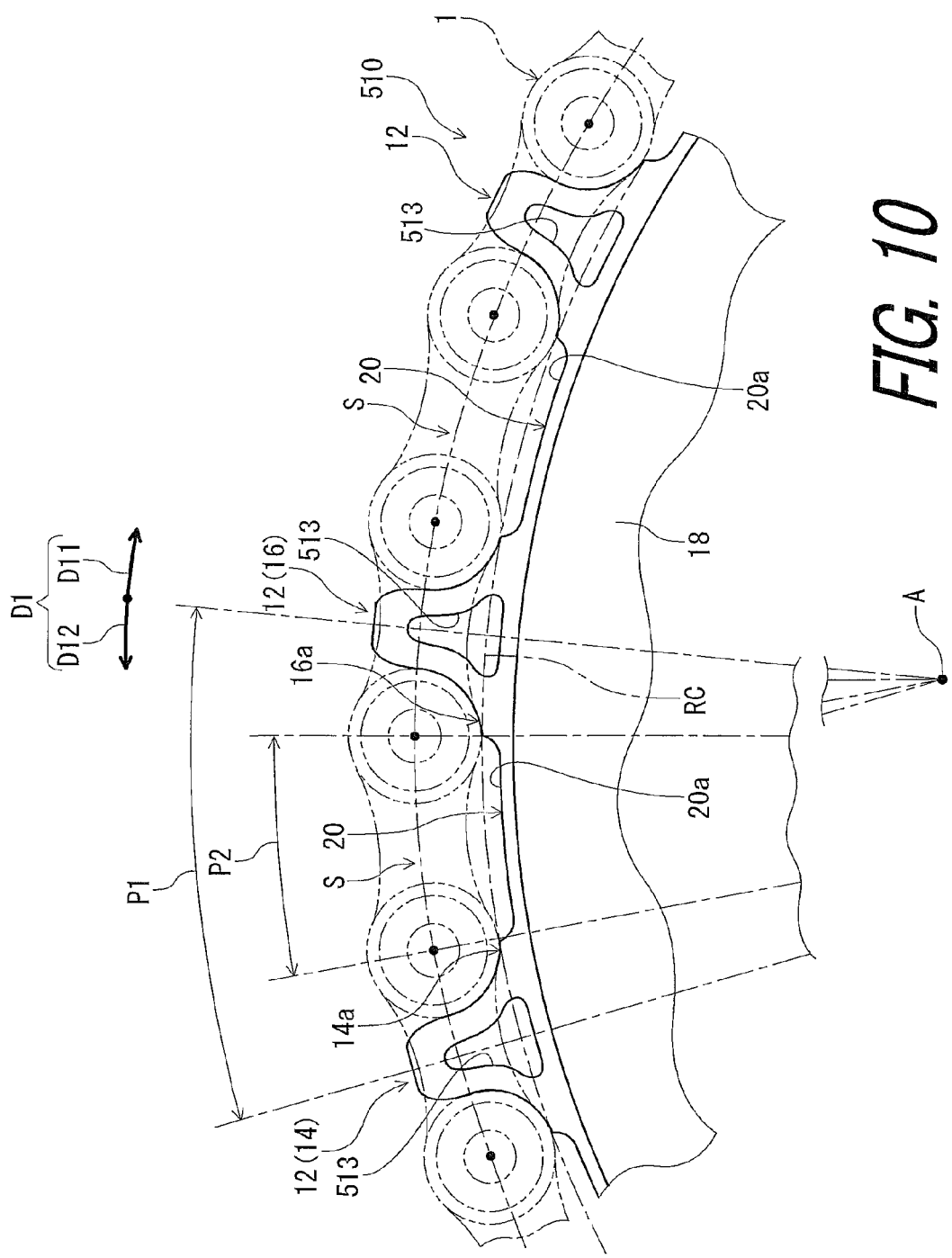
FIG. 10 is an enlarged elevational view of a bicycle sprocket in accordance with a fifth embodiment.

As seen in FIG. 10, each of the sprocket teeth 12 includes the tooth bottom 12a (e.g., the tooth bottoms 14a and 16a) defining the root circle RC of the bicycle sprocket 10. At least one of the sprocket teeth 12 includes a closed opening at least partially provided radially outward of the root circle RC. In the illustrated embodiment, each of the sprocket teeth 12 includes a closed opening 513 at least partially provided radially outward of the root circle RC. The closed opening 513 can be entirely provided radially outward of the root circle RC.

With the bicycle sprocket 510, the closed openings 513 can save weight of the sprocket teeth 12 in addition to the advantageous effect obtained by the bicycle sprocket 10 in accordance with the first embodiment.

Sixth Embodiment

A bicycle sprocket 610 in accordance with a sixth embodiment will be described below referring to FIG. 11. The bicycle sprocket 610 has the same configuration as the bicycle sprocket 10 except for the sprocket teeth 12. Thus, elements having substantially the same function as those in the first embodiment will be numbered the same here, and will not be described again in detail here for the sake of brevity.

Figure 11:
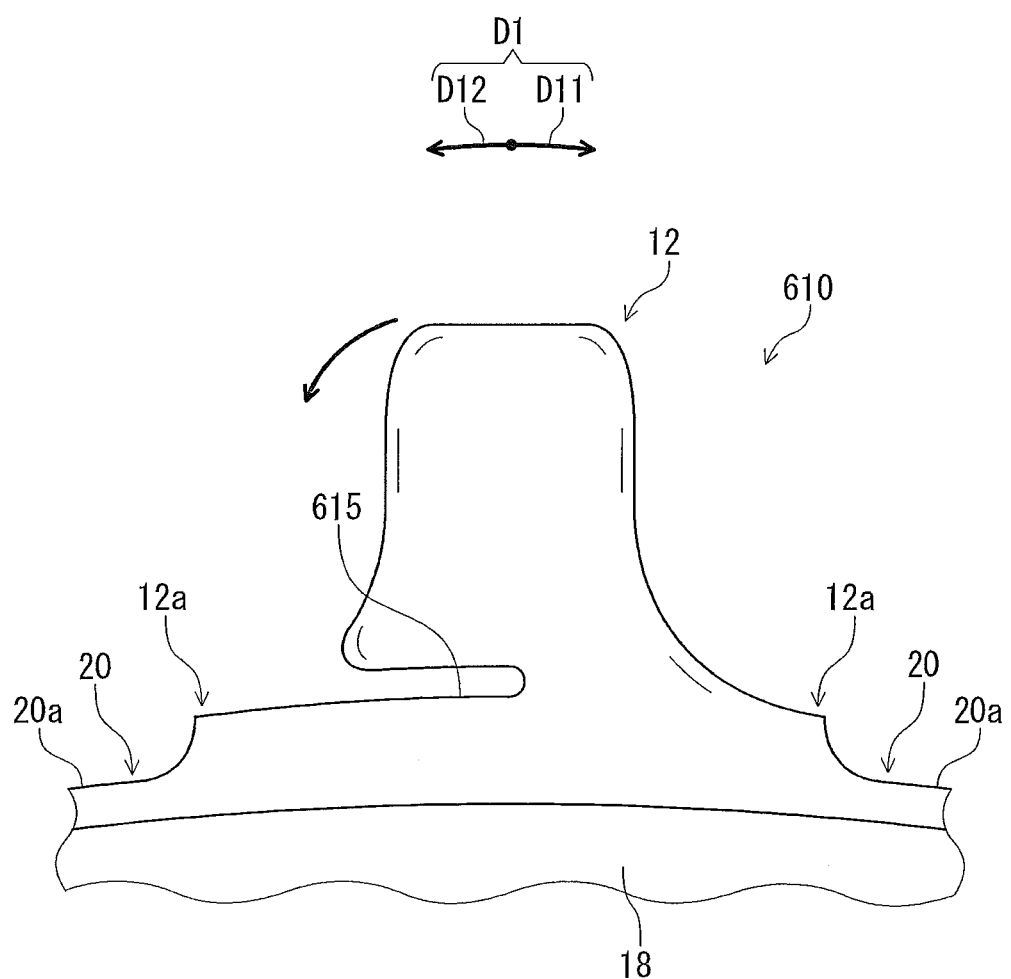
FIG. 11 is an enlarged elevational view of a bicycle sprocket in accordance with a sixth embodiment.

As seen in FIG. 11, at least one of the sprocket teeth 12 includes a cutout 615 configured increase flexibility of the at least one of the sprocket teeth 12. In the illustrated embodiment, the cutout 615 extends in the circumferential direction D1. More specifically, the cutout 615 extends in the rotational driving direction D11 from one of the tooth bottoms 12a toward the other of the tooth bottoms 12a. The shape of the cutout 615 is not limited to the illustrated embodiment.

With the bicycle sprocket 610, the cutout 615 allows the sprocket tooth 12 to absorb a shock caused by the sprocket teeth 12 and the bicycle chain 1 in addition to the advantageous effect obtained by the bicycle sprocket 10 in accordance with the first embodiment.

Seventh Embodiment

A bicycle sprocket 710 in accordance with a third embodiment will be described below referring to FIG. 12. The bicycle sprocket 710 has the same configuration as the bicycle sprocket 10 except for the sprocket teeth 12. Thus, elements having substantially the same function as those in the first embodiment will be numbered the same here, and will not be described again in detail here for the sake of brevity.

Figure 12:
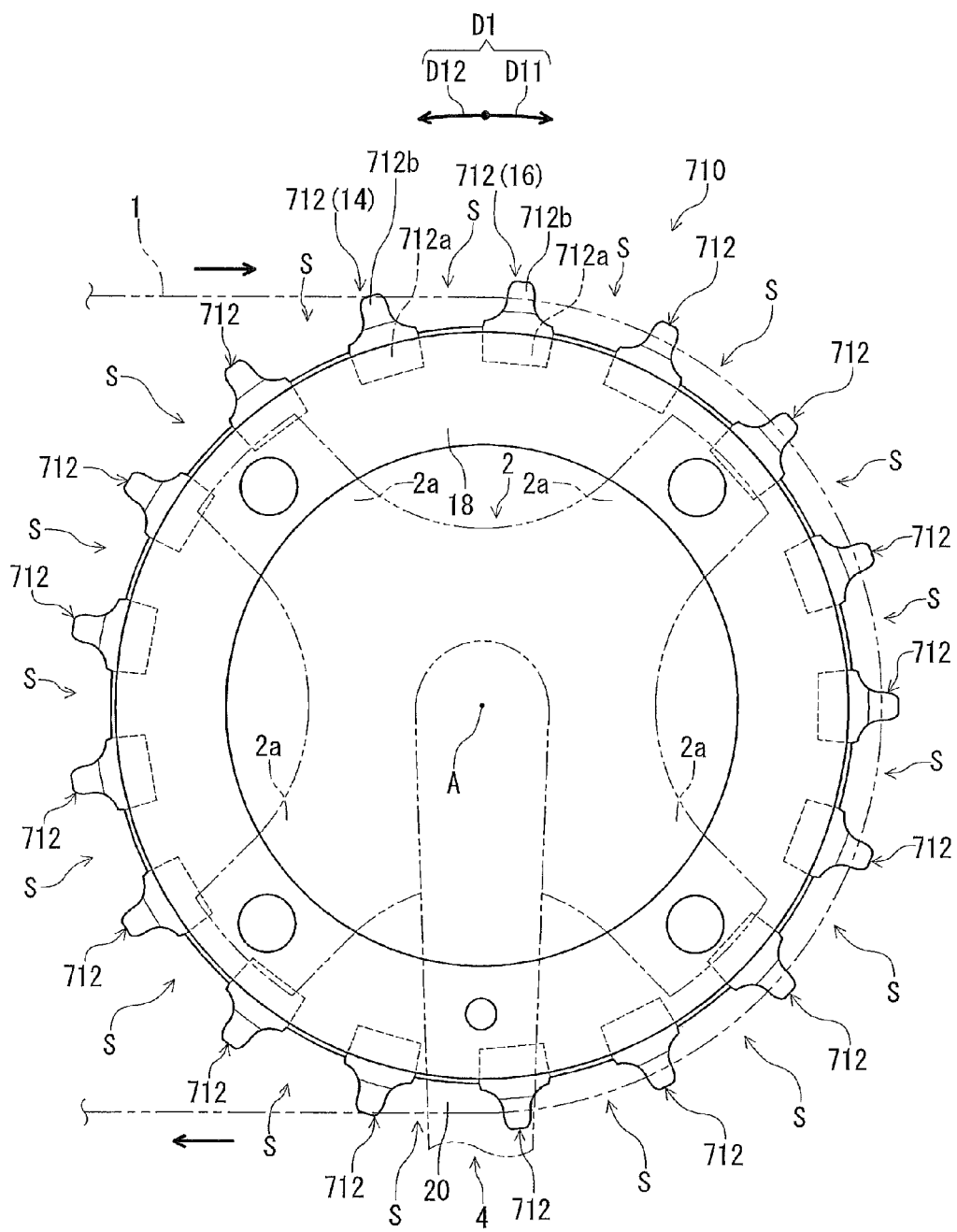
FIG. 12 is an elevational view of a bicycle sprocket in accordance with a seventh embodiment.

As seen in FIG. 12, the bicycle sprocket 710 comprises sprocket teeth 712. The bicycle sprocket 710 further comprises a sprocket body 718 having an annular shape. The sprocket teeth 712 are separate members from each other and spaced apart from each other in the circumferential direction D1 of the bicycle sprocket 710.

Each of the sprocket teeth 712 includes a base part 712a and a tooth part 712b. The base part 712a is implanted in the sprocket body 718. The tooth part 712b radially outwardly protrudes from the base part 712a. Each of the sprocket teeth 712 is made of a first material comprising a metallic material. The sprocket body 718 is made of a second material comprising a resin material. The sprocket teeth 712 are at least partially embedded in the sprocket body 718 by integral molding such as insertion molding.

With the bicycle sprocket 710, since the sprocket body 718 is made of the second material comprising a resin material, it is possible to save weight of the bicycle sprocket 710 in addition to the advantageous effect obtained by the bicycle sprocket 10 in accordance with the first embodiment.

Eighth Embodiment

A bicycle sprocket 810 in accordance with an eighth embodiment will be described below referring to FIGS. 13 and 14. The bicycle sprocket 810 has the same configuration as the bicycle sprocket 10 except for the sprocket teeth 12. Thus, elements having substantially the same function as those in the first embodiment will be numbered the same here, and will not be described again in detail here for the sake of brevity.

Figure 13:
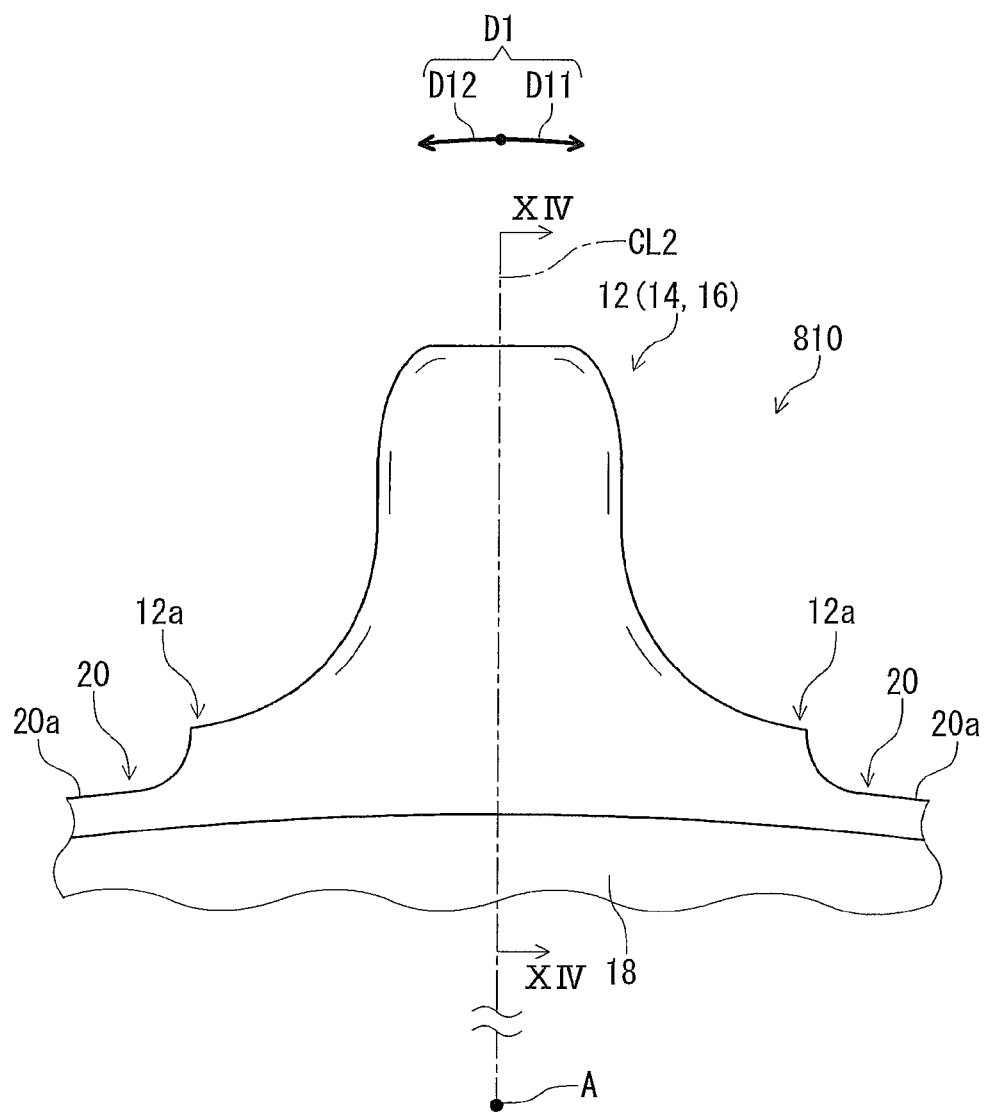
FIG. 13 is an enlarged elevational view of a bicycle sprocket in accordance with an eighth embodiment.

As seen in FIG. 13, the sprocket teeth 12 are equally spaced apart from each other in the circumferential direction D1 of the bicycle sprocket 810. Each of the sprocket teeth 12 has a center line CL2 radially extending from the rotational axis A of the bicycle sprocket 810. Each of the sprocket teeth 12 has a symmetrical shape with respect to the center line CL2. More specifically, each of the sprocket teeth 12 has a symmetrical shape with respect to the center line CL2 when viewed from a direction of the rotational axis A.

Figure 14:
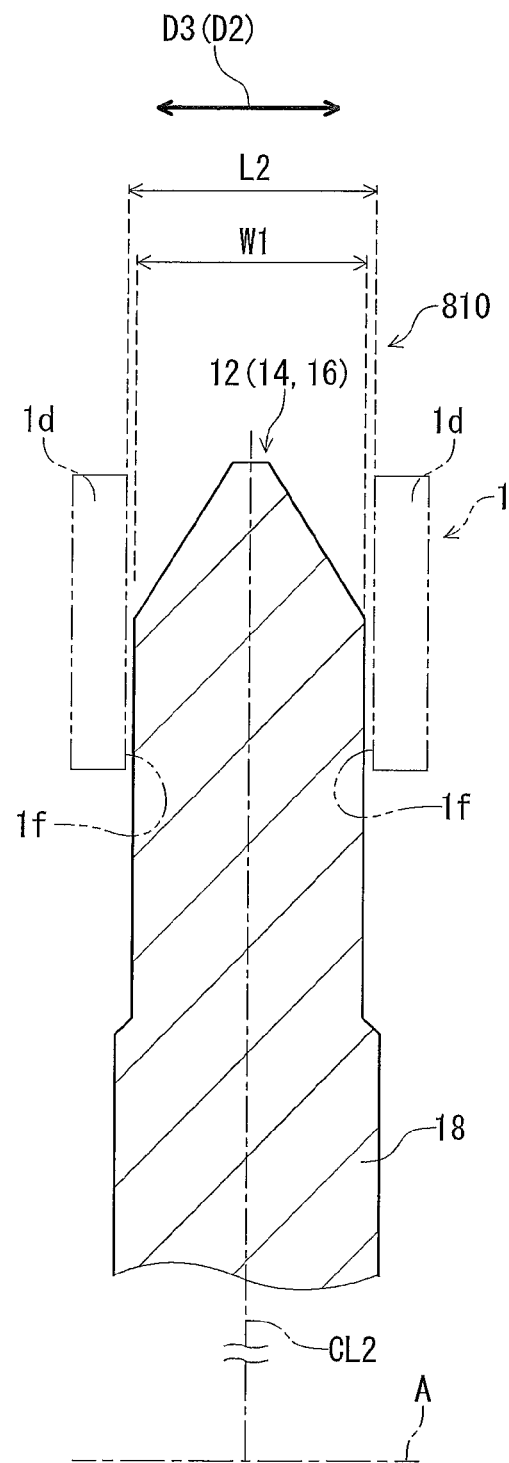
FIG. 14 is a cross-sectional view of the bicycle sprocket taken along line XIV-XIV of FIG. 13.

As seen in FIG. 14, each of the sprocket teeth 12 has a symmetrical shape with respect to the center line CL2 when viewed from the circumferential direction D1 of the bicycle sprocket 810. The center line CL2 is perpendicular to the rotational axis A.

With the bicycle sprocket 810, since each of the sprocket teeth 12 has a symmetrical shape with respect to the center line CL2, both circumferential sides of the sprocket tooth 12 can be used as a driving side configured to face in the rotational driving direction D11. This allows the bicycle sprocket 810 to be used as a both-side usable sprocket in addition to the advantageous effect obtained by the bicycle sprocket 10 in accordance with the first embodiment.

Ninth Embodiment

A bicycle sprocket 910 in accordance with a ninth embodiment will be described below referring to FIGS. 15 and 16. The bicycle sprocket 910 has the same configuration as the bicycle sprocket 10 except for the sprocket teeth 12. Thus, elements having substantially the same function as those in the first embodiment will be numbered the same here, and will not be described again in detail here for the sake of brevity.

Figure 15:
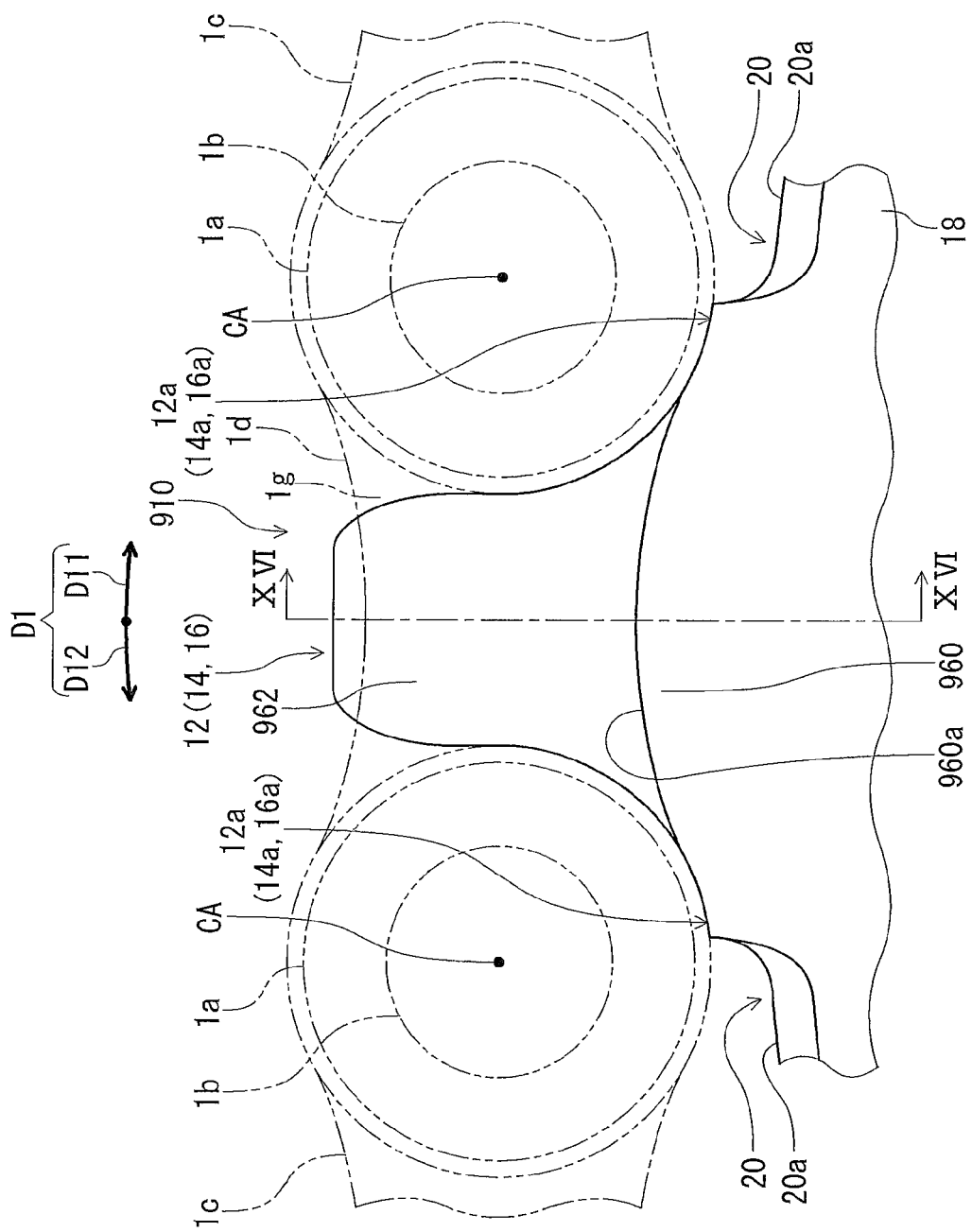
FIG. 15 is an enlarged elevational view of a bicycle sprocket in accordance with a ninth embodiment.
Figure 16:
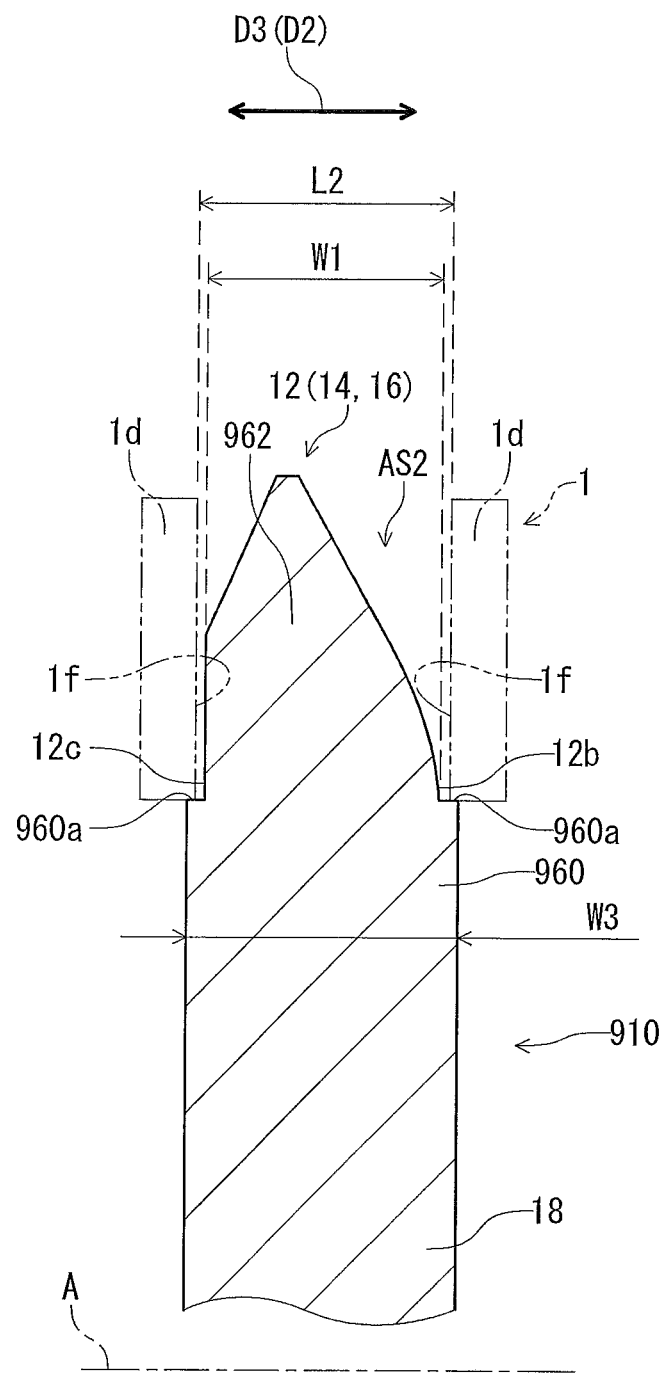
FIG. 16 is a cross-sectional view of the bicycle sprocket taken along line XVI-XVI of FIG. 15.

As seen in FIGS. 15 and 16, in the bicycle sprocket 910, at least one of the first tooth 14 and the second tooth 16 includes a radial contact part 960 configured to contact at least one of intermediate portions 1g of outer link plates 1d of the bicycle chain 1 in a radial direction D4 of the bicycle sprocket 910 in a state where the at least one of the first tooth 14 and the second tooth 16 engages with the outer link plates 1d of the bicycle chain 1.

As seen in FIG. 15, the first tooth 14 includes a tooth body 962 radially outwardly protruding from the radial contact part 960. The radial contact part 960 is closer to the tooth bottoms 12a than the tooth body 962. A radial outer surface 960a of the radial contact part 960 has a shape complementary with an outer shape of the intermediate portion 1g of the outer link plate 1d.

As seen in FIG. 16, for example, the tooth body 962 has the chain-engaging axial width W1. The tooth body 962 includes the first chain-engaging surface 12b and the second chain-engaging surface 12c. The radial contact part 960 protrudes from the first chain-engaging surface 12b and the second chain-engaging surface 12c. The radial contact part 960 can, however, protrude from at least one of the first chain-engaging surface 12b and the second chain-engaging surface 12c. The radial contact part 960 has an axial width W3 larger than the second distance L2. The axial width W3 is larger than the chain-engaging axial width W1.

With the bicycle sprocket 910, the radial contact part 960 is configured to contact the intermediate portions 1g of the outer link plates 1d of the bicycle chain 1 in the radial direction D4. Accordingly, the radial contact part 960 can improve stability of the outer link plates 1d engaging with the first tooth 14 and/or the second tooth 16 in addition to the advantageous effect obtained by the bicycle sprocket 10 in accordance with the first embodiment.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "fixed" and their derivatives except for the terms "bonded" and "bonding."

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers such as the terms "first" or "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
   sprocket teeth including
      a first tooth having a chain-engaging axial width which is larger than a first distance defined between opposed inner link plates of a bicycle chain and which is smaller than a second distance defined between opposed outer link plates of the bicycle chain, and a second tooth having a chain-engaging axial width which is larger than the first distance and which is smaller than the second distance, the first tooth and the second tooth being spaced apart from each other in a circumferential direction of the bicycle sprocket to define a space which is free of a tooth configured to engage with the bicycle chain.

2. The bicycle sprocket according to claim 1, wherein each of the sprocket teeth has a chain-engaging axial width which is larger than the first distance and which is smaller than the second distance.

3. The bicycle sprocket according to claim 2, wherein all the sprocket teeth are spaced apart from each other in the circumferential direction to define spaces which is free of a tooth configured to engage with the bicycle chain.

4. The bicycle sprocket according to claim 2, wherein a tooth pitch defined between adjacent two of the sprocket teeth is twice as long as a roller pitch defined between adjacent two of rollers of the bicycle chain.

5. The bicycle sprocket according to claim 1, wherein at least one of the first tooth and the second tooth includes a chamfered part configured to reduce interfere between one of the inner link plates of the bicycle chain and the at least one of the first tooth and the second tooth in a state where the first tooth and the second tooth engage with the bicycle chain.

6. The bicycle sprocket according to claim 5, wherein each of the first tooth and second tooth includes a tooth bottom defining a root circle of the bicycle sprocket, and the chamfered part of the at least one of the first tooth and the second tooth is adjacent to the tooth bottom of the at least one of the first tooth and the second tooth.

7. The bicycle sprocket according to claim 1, further comprising:

at least one additional tooth having a chain-engaging axial width which is smaller than the first distance, wherein each of the at least one additional tooth is disposed between adjacent two of the sprocket teeth such that the bicycle chain is shifted between the bicycle sprocket and additional bicycle sprocket in an area in which the at least one additional tooth is positioned.

8. The bicycle sprocket according to claim 1, further comprising:

a spike pin configured to guide the bicycle chain toward the sprocket teeth during shifting operation.

9. The bicycle sprocket according to claim 1, wherein each of the sprocket teeth has a multi-layered structure with different materials.

10. The bicycle sprocket according to claim 9, wherein each of the sprocket teeth includes a first sprocket layer made of a first-layer material comprising iron, a second sprocket layer made of a second-layer material comprising aluminum, and a third sprocket layer made of a third-layer material comprising iron, the second sprocket layer being provided between the first sprocket layer and the third sprocket layer.

11. The bicycle sprocket according to claim 9, wherein each of the sprocket teeth includes a first sprocket layer made of a first-layer material comprising iron, a second sprocket layer made of a second-layer material comprising a resin material, and a third sprocket layer made of a third-layer material comprising iron, the second sprocket layer being provided between the first sprocket layer and the third sprocket layer.

12. The bicycle sprocket according to claim 1, wherein each of the sprocket teeth includes a tooth bottom defining a root circle of the bicycle sprocket, and at least one of the sprocket teeth includes a closed opening at least partially provided radially outward of the root circle.

13. The bicycle sprocket according to claim 1, wherein at least one of the sprocket teeth includes a cutout configured increase flexibility of the at least one of the sprocket teeth.

14. The bicycle sprocket according to claim 1, further comprising:

a recess provided between the first tooth and the second tooth in a circumferential direction of the bicycle sprocket.

15. The bicycle sprocket according to claim 14, wherein the first tooth includes a first tooth bottom defining a root circle of the bicycle sprocket, the second tooth includes a second tooth bottom defining the root circle, and the recess is provided between the first tooth bottom and the second tooth bottom in a circumferential direction of the bicycle sprocket.

16. The bicycle sprocket according to claim 1, further comprising:

a sprocket body having an annular shape, wherein, the sprocket teeth are separate members from each other and spaced apart from each other in a circumferential direction of the bicycle sprocket, and each of the sprocket teeth includes a base part implanted in the sprocket body, and a tooth part radially outwardly protruding from the base part.

17. The bicycle sprocket according to claim 16, wherein each of the sprocket teeth is made of a first material comprising a metallic material, and the sprocket body is made of a second material comprising a resin material.

18. The bicycle sprocket according to claim 1, wherein the sprocket teeth are equally spaced apart from each other in a circumferential direction of the bicycle sprocket, each of the sprocket teeth has a center line radially extending from a rotational axis of the bicycle sprocket, and each of the sprocket teeth has a symmetrical shape with respect to the center line.

19. The bicycle sprocket according to claim 1, wherein at least one of the first tooth and the second tooth includes a radial contact part configured to contact at least one of intermediate portions of outer link plates of the bicycle chain in a radial direction of the bicycle sprocket in a state where the at least one of the first tooth and the second tooth engages with the outer link plates of the bicycle chain.

20. The bicycle sprocket according to claim 19, wherein the radial contact part has an axial width larger than the second distance.

* * * * *